(12) United States Patent
Jiang et al.

(10) Patent No.: US 10,773,394 B2
(45) Date of Patent: Sep. 15, 2020

(54) OPPOSED, CONTROLLABLE GECKO ADHESIVE GRIPPER SYSTEM WITH SCALABLE MANUFACTURABILITY

(71) Applicant: Flexiv Ltd., Santa Clara, CA (US)

(72) Inventors: Hao Jiang, Mountain View, CA (US); Shiquan Wang, Foster City, CA (US)

(73) Assignee: Flexiv Ltd., Grand Cayman (KY)

( * ) Notice: Subject to any disclaimer, the term of this patent is extended or adjusted under 35 U.S.C. 154(b) by 163 days.

(21) Appl. No.: 16/113,239

(22) Filed: Aug. 27, 2018

(65) Prior Publication Data

US 2019/0061169 A1 Feb. 28, 2019

Related U.S. Application Data

(60) Provisional application No. 62/550,378, filed on Aug. 25, 2017.

(51) Int. Cl.
*B25J 15/00* (2006.01)
*B32B 7/12* (2006.01)

(52) U.S. Cl.
CPC .......... *B25J 15/008* (2013.01); *B25J 15/0052* (2013.01); *B32B 7/12* (2013.01); *B32B 2307/546* (2013.01); *B32B 2405/00* (2013.01)

(58) Field of Classification Search
CPC ....... B25J 15/008; B25J 15/0052; B32B 7/12; B32B 2405/00; B32B 2307/546
See application file for complete search history.

(56) References Cited

U.S. PATENT DOCUMENTS

| 8,703,632 | B2* | 4/2014 | Schlueter | B32B 5/18 442/221 |
| 2014/0036404 | A1 | 2/2014 | Prahlad et al. | |
| 2014/0065347 | A1 | 3/2014 | Sitti et al. | |
| 2014/0272272 | A1 | 9/2014 | Spenko et al. | |
| 2016/0200945 | A1 | 7/2016 | Hawkes et al. | |
| 2017/0066138 | A1 | 3/2017 | Hawkes | |
| 2017/0362835 | A1* | 12/2017 | Nielsen | B32B 5/022 |

OTHER PUBLICATIONS

International Search Report for International Application No. PCT/IB2018/056513, dated Dec. 7, 2018; (13 pages).

* cited by examiner

*Primary Examiner* — Brian Handville
(74) *Attorney, Agent, or Firm* — K&L Gates LLP

(57) ABSTRACT

A gripper system is provided that includes first and second linear carriages and first and second gecko adhesive patches. The gecko adhesive patches may have first and second surfaces, and a thin rigid backing may be attached to the second surface of the gecko adhesive patches. At least one layer of non-stretchable, flexible film may be glued to the thin rigid backing and a thick rigid backing may be glued to the film. The gripper system may further include a loading film. In other embodiments, the gripper system may include first and second pluralities of support tendons, which may connect the gecko adhesive patches to the carriages.

20 Claims, 5 Drawing Sheets

OPPOSED, CONTROLLABLE GECKO ADHESIVE GRIPPER SYSTEM WITH SCALABLE MANUFACTURABILITY

PRIORITY CLAIM

This application claims the benefit of priority under 35 U.S.C. § 119(e) to U.S. Provisional Patent Application Ser. No. 62/550,378, entitled "OPPOSED, CONTROLLABLE GECKO ADHESIVE GRIPPER SYSTEM WITH SCALABLE MANUFACTURABILITY" and filed on Aug. 25, 2017, the disclosure of which is herein incorporated by reference in its entirety.

BACKGROUND

Directional gecko-adhesive gripper systems conventionally use either tendons or foam to load the adhesives. String tendons are routed and glued to three-dimensional, pre-drilled holes on the corner of fiberglass backings, which are difficult to manufacture and scale up. These tendons are only attached to the adhesive tiles along the preferred shear direction (X axis), which optimizes the load in the X-Z (preferred-shear-normal) plane, but limits the loading capability in the Y (lateral shear) direction. For example, the resulting X (preferred shear) capability of such systems is usually 2-3 times larger than the shear capability in the Y (lateral shear) direction. Also, fiberglass backings are difficult to make and cut, especially with adhesives attached. Further, foam can lead to non-uniform loading on the adhesive patches, which can reduce the overall adhesive capability and can cause creeping problems. For example, when a gripper is held under a moderate load for a long time, failure may gradually propagate throughout the adhesive patches, making the adhesive capability time dependent. Foam, which is usually placed on top of the adhesives, also contributes to an extra moment load that tends to peel the adhesives off from the surface. No previous directional and controllable gecko-adhesive grippers can be scaled up for mass production due to sophisticated design and large amounts of labor required.

There exists a need for a directional and controllable gecko-adhesive gripper that can handle equal amount of load in all shear directions and can be scaled up for mass production. The present gripper system with rigid backing and three non-stretchable flexible film pieces as actuation element can be easily scaled up for mass production with much lower cost and much larger loading capability than previous controllable gecko gripper systems.

SUMMARY

The present disclosure presents new and innovative systems for gecko-adhesive gripper systems. In one embodiment, a gripper system is provided comprising a first linear carriage, a second linear carriage spaced apart from the first linear carriage, a first gecko adhesive patch, having first and second surfaces, wherein the first surface consists of a microwedge controllable adhesive, and a second gecko adhesive patch, having a first and second surface, wherein the first surface consists of a microwedge controllable adhesive. The gripper system may also include at least one thin rigid backing, attached to the second surface of the first and second gecko adhesive patches at least one layer of non-stretchable, orthogonal flexible film glued to the thin rigid backing, and a thick rigid backing glued to the film.

In another embodiment, the thick rigid backing further comprises a loading film connected to the thick rigid backing and one of the first or second linear carriage. In a further embodiment, the thick rigid backing is connected to the first and second linear carriages. In a still further embodiment, the first and second linear carriages are constrained on a linear rail and connected with a spring.

In another embodiment, the gripper system may further comprise a first plurality of support tendons connected to the first gecko adhesive patch and the first linear carriage and a second plurality of support tendons connected to the second gecko adhesive patch and the second linear carriage. In a further embodiment, the gripper system may further comprise a third plurality of support tendons, at least one of the third plurality of support tendons is connected to the first gecko adhesive patch and a load tendon, and at least one of the third plurality of support tendons is connected to the second adhesive patch and the load tendon.

In another embodiment, the first gecko adhesive patch is rectangular in shape and the first plurality of support tendons includes support tendons connected between each of at least three edges of the first gecko adhesive patch and the first linear carriage, and the second gecko adhesive patch is rectangular in shape and the second plurality of support tendons includes support tendons connected between each of at least three edges of the second gecko adhesive patch and the second linear carriage. In a further embodiment the first and second pluralities of support tendons are taut, and the third plurality of support tendons has slack when the gripper system is not under a load.

In another embodiment, the microwedge controllable adhesive of the first and second gecko adhesive patches includes a plurality of microwedges that bend under shear load to increase the surface area of contact with a surface and thereby adhere to the surface. In a further embodiment, the gripper system may further comprise at least three layers of non-stretchable, orthogonal flexible film glued to the thin rigid backing. In a still further embodiment, the gripper system may further comprise a soft material attached to the thick rigid backing and the first or second linear carriage.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1A:
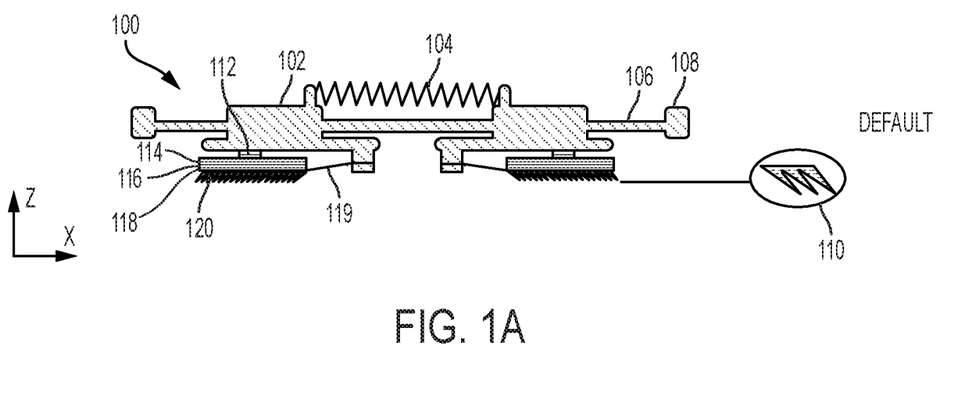
FIGS. 1A-1C illustrate a gecko gripper system being attached and detached from a surface, according to an example embodiment of the present disclosure.
Figure 1B:
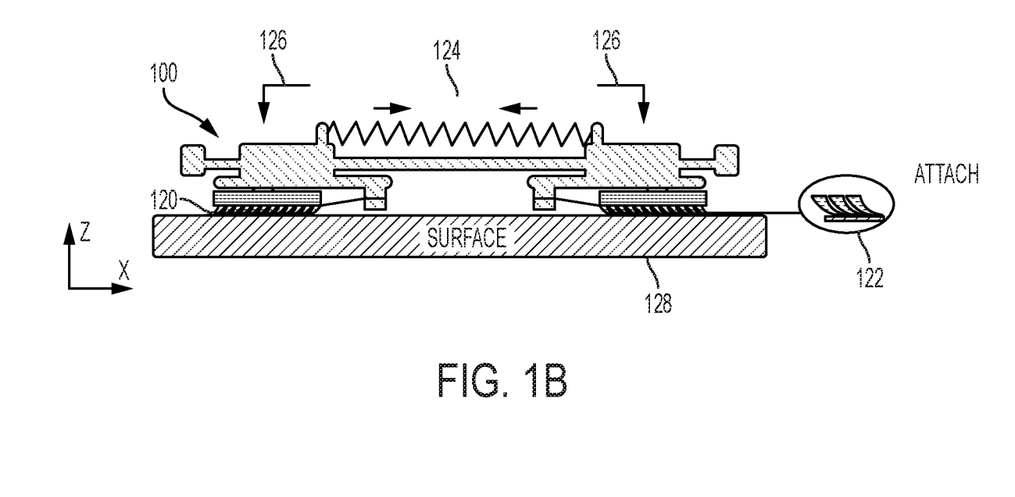
Figure 1C:
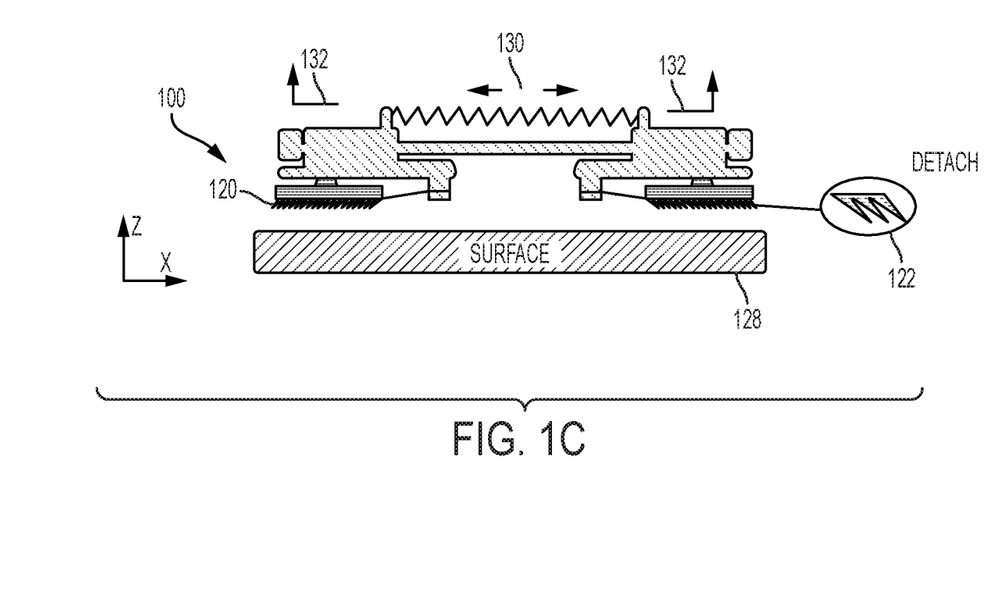

FIGS. 1A-1C illustrate a gecko gripper system 100 being attached and detached from a surface 128, according to an example embodiment of the present disclosure. These figures include more than one of certain components, but for clarity only a single instance of each component will be numbered in each figure, although the same reference number may refer to one or more of the components, as described below.

The gecko gripper system 100 includes two directional, controllable gecko-adhesive patches 120 that may be oriented in opposite directions, shown in FIG. 1A in a default state 110 (i.e., unattached). For example, the adhesive patch 120 on the left includes microwedges angled down and to the left, while the adhesive patch 120 on the right includes microwedges angled down and to the right. Each adhesive patch 120 may have a predetermined area of microwedge controllable adhesives (e.g., 645 mm$^2$ to 1290 mm$^2$ of microwedge controllable adhesives, depending on specific applications). The microwedge adhesives may be made of a rubbery material with low surface energy (e.g., a silicone material such as PDMS silicone). By default, the wedges are straight, such that the contact area of the microwedges with a surface 128 (not depicted in FIG. 1A) in a default state 110 only includes the tips of the microwedges. Because of the small surface area of contact between the microwedges and the surface 128, the adhesives patches 120 do not adhere to the surface 128.

In the illustrated embodiment, each adhesive patch is attached to a thin rigid backing 118 (e.g., a 1.5 mm thick acrylic backing). A nonstretchable flexible film 116 (e.g., Kapton® polyimide film, PET film, Mylar film, Kevlar ribbon) may then be glued to the thin rigid backing 118. A second, thick rigid backing 114 (e.g., a 3 mm acrylic) may then be glued to the film 116 and the thin rigid backing 118. The thin rigid backing 118 and thick rigid backing 114 may be made from an acrylic material, metal (e.g., aluminum, steel, copper), plastics, fiberglass, carbon fiber, or any other rigid material. As discussed in greater detail below, the thickness of the thin rigid backing 118 and the thick rigid backing 114 may be selected such that the clamping film 119 has a loading angle of 6 to 10 degrees. The adhesive patches 120 are thus attached to a rigid tile backing with an extended film for loading, formed by the rigid backings 114, 118 and the film 116.

In the illustrated embodiment, the tile may then be connected to a linear carriage 102 with a soft material 112 (e.g., silicone foam), which provides flexibility and enables the rigid tile to conform to the gripped surface 128. The film 116 may also be further clamped to the linear carriage 102 as well with a clamping film 119 that runs on an angle through the center of the adhesive patch 120. The clamping film 119 oriented in the X-Z plane may have a loading angle of 6-10 degrees from X shear. In certain embodiments, the gecko gripper system 100 may also include a lateral film (e.g., lateral film 134 in FIG. 2), which is oriented along the Y shear. The clamping film 119 and lateral film 134 may be made from similar materials as the film 116, although in certain implementations the specific material of one or more of the film 116, the lateral film 134, and the clamping film 119 may differ depending on desired performance characteristics. The two linear carriages 102 are constrained on a linear rail 106 and connected with a spring 104 for preloading during attachment.

The gecko gripper system 100 illustrated in FIGS. 1A and 1B may use rigid backings 114, 118 with non-stretchable flexible film 116 as an actuation element. Both the rigid backings 114, 118 and the non-stretchable flexible film 116 may be made and cut to custom sizes, e.g., laser cut to custom sizes. Additional rigid backings 114, 118 may then be laminated onto existing backings to increase bending stiffness, making the adhesives 120 uniformly loaded. The non-stretchable flexible film 116 may be sandwiched in between the rigid backings 114, 118 with glue, may allow the load to go through the center of the adhesives. The clamping film 119 may have a controlled loading angle, e.g., a loading angle of 6-10 degree. The loading angle may be selected based on the adhesion characteristics of the adhesive patch 120. For example, the loading angle may be selected to correspond to the angle at which the adhesive patch 120 exhibits the strongest adhesion force. Once a desired loading angle has been identified, the loading angle of the clamping film 119 may be set by adjusting the geometry of the rigid backing 114, 118, the soft material 112, and the film 116. For example, the thicknesses of these components may be selected (e.g., the thickness of the rigid backings 114, 118) such that the clamping film 119 has the desired loading angle (e.g., 6 to 10 degrees) when connected to the linear carriage 102. In certain implementations, the film 116 and the clamping film 119 may be the same piece of film (e.g., a single piece of film 116 may run through the center of the adhesive patch 120 and attach to the linear carriage 102 at the desired loading angle. The rigid backings 114, 118 and the film 116 may be manufactured efficiently by gluing layers of material together (e.g., the rigid backing 114 may be manufactured by gluing multiple layers of acrylic on top of one another).

In this configuration, the creeping failures of the prior art may be avoided. However, as will be discussed in greater detail below, although the X-Z plane adhesion of the gecko gripper 100 is comparable to previous controllable gecko-adhesive grippers, the Y-direction adhesion is considerably improved.

During attachment (depicted in FIG. 1B), an external actuation separates the two carriages 102 apart and brings the adhesives 120 into contact with a surface 128 (operation 126). The normal pressing force can be as little as 0.1 KPa. When the actuation is released, the spring 104 retracts the carriages 102, which preload the adhesives 120 inward (operation 124). During this preload operation, the microwedges of the adhesive 120 then bend, which dramatically increases the contact area between the microwedges and the surface 128, as shown in the attached state 122. The adhesives 120 are thus activated and capable of adhering to the surface 128.

Figure 2:
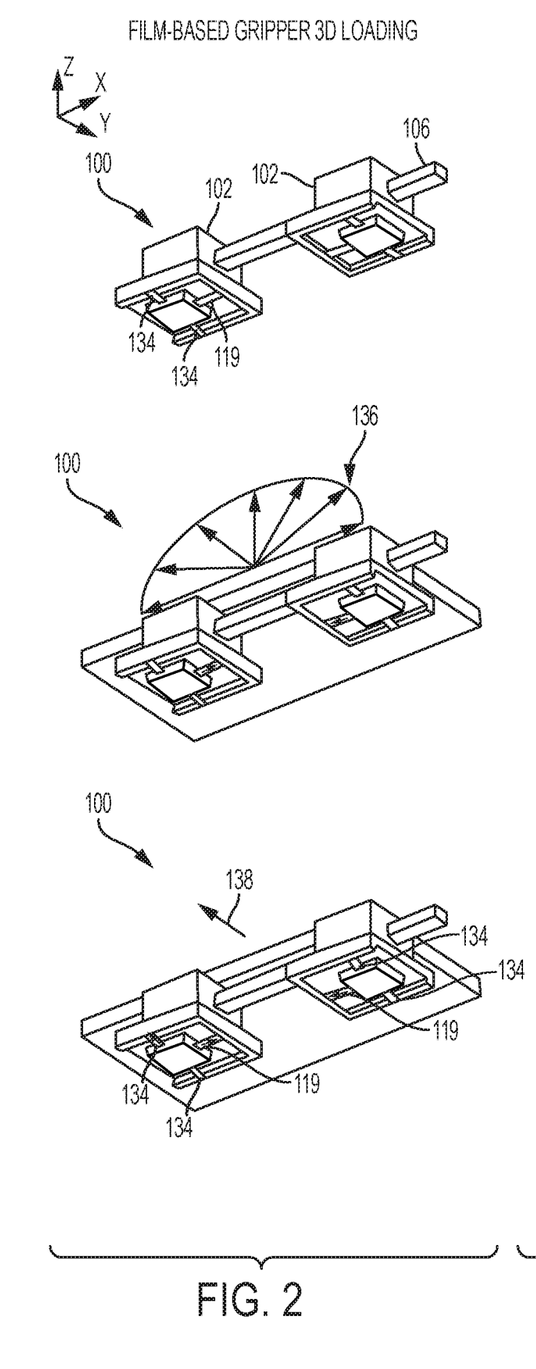
FIG. 2 illustrates an exemplary loading of a gecko gripper system, according to an example embodiment of the present disclosure.

Loads 136 applied to the gripper system in the X-Z plane are transmitted to the main film 119 of the two tiles, and loads 138 applied in the Y direction are transmitted to the lateral film 134, as shown in FIG. 2. Previous grippers had coupled load transmissions in all three directions (i.e., in the X, Y, and Z directions), which limited adhesion capabilities in the Y direction. For example, in chart 310 of FIG. 3, the Y component of the applied load is limited by the loading angle 320, 322. The loading angle 320, 322 may result from the loading angle 316, 318 selected in chart 308 to optimize the adhesion capacity within the adhesion limits 332 of the X-Z plane. However, because the loads are coupled (i.e., the loading angles 320 and 322 are the same), the selected loading angle 316, 318 constrains the loading angle 320, 322 in the X-Y plane, thereby limiting the Y-direction adhesion limit, despite the overall adhesion limit 334 of the adhesive patch 120 in the X-Y plane allowing for much larger loads in the Y direction. By contrast, inclusion of the lateral film 134 decouples load transmission in the Y direction from load transmission in the X-Z plane. This decoupling enables configuring the preload operations 124, 126 for a desired adhesion force in the Y direction for each adhesive tile independent of the adhesion force for loads in the X-Z plane. For example, in chart 312, when the loading angle 324, 326 is selected to optimize the adhesion capacity within the adhesion limits 336 of the X-Z plane, the loading capacity in chart 314 is not constrained to the same angle. In particular, the angle 330 is no longer coupled to be the same as the loading angle 328 and may therefore be selected to use more of the overall adhesion limit 338 and thereby increase the Y-direction adhesion limit. For example, the adhesion capability of the entire gripper 100 may be configured for up to 25 KPa in X-direction shear loads, 20 KPa in Y-direction shear loads, and 7 KPa in Z-direction normal loads.

Figure 4:
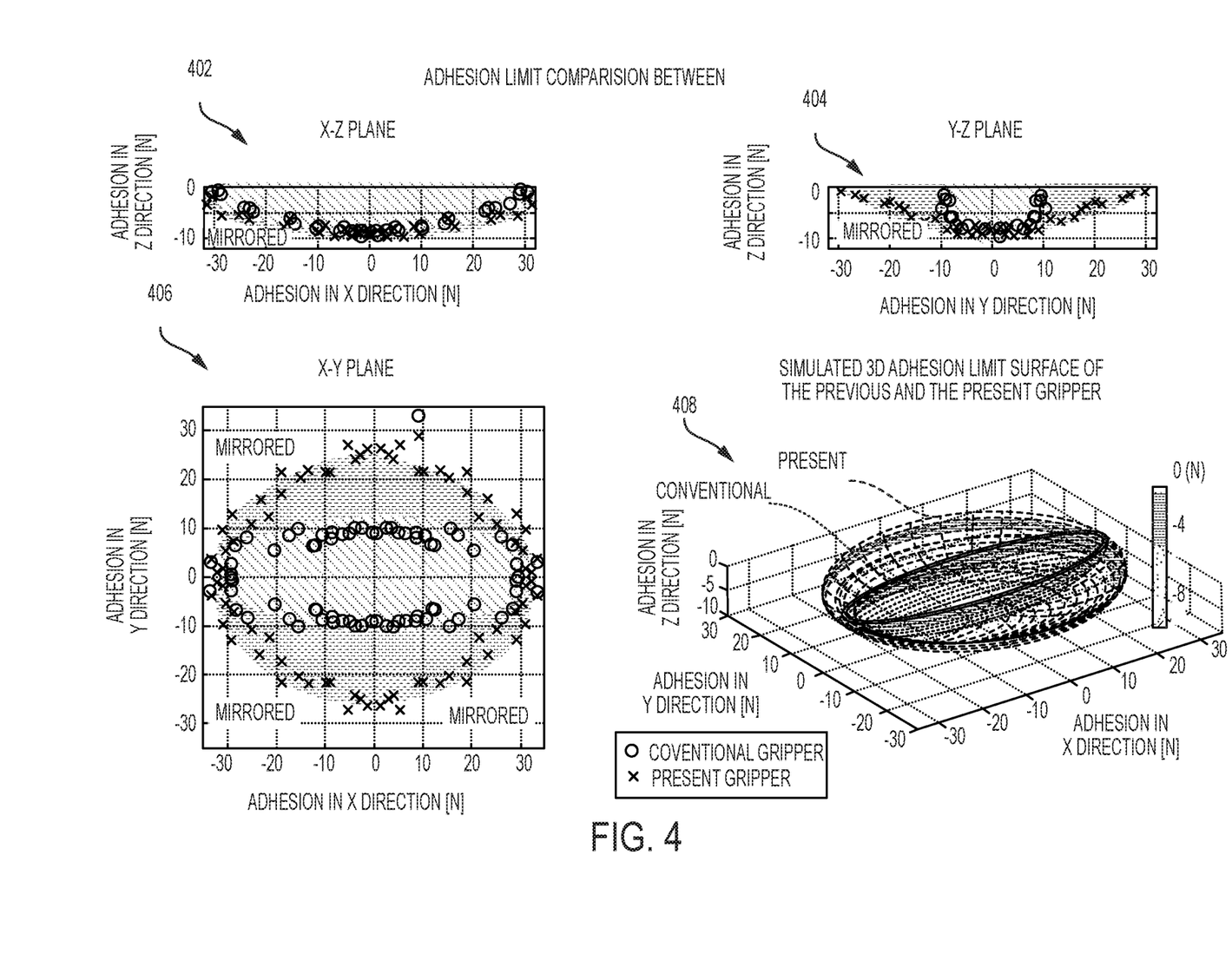
FIG. 4 illustrates charts comparing the adhesion limits of gecko gripper systems, according to example embodiments of the present disclosure.

The improved adhesion capability of the gripper system 100 over the previous gripper system is shown in FIG. 4. Graphs 402, 404, 406 depict the adhesion capabilities for loads applied in the X-Z, Y-Z, and X-Y planes respectively, with the X, Y, and Z directions defined as in FIGS. 1A-1C, 2, and 3. The circular-shaped data points show the adhesion limits of a conventional gripper system, while the x-shaped data points reflect the adhesion limits of the gripper system 100. As can be seen in graph 402, the gripper system 100 has similar adhesion limits in the X-Z plan as the conventional gripper system. In particular, both gripper systems have an approximate adhesion limit of 30 N in the X direction and an approximate adhesion limit of 10 N in the Z direction for loads applied in the X-Z plane. However, graph 404 shows that the gripper system 100 has considerably higher adhesion limits for loads applied in the Y-Z plane. For example, under a load in the Y-Z plane, the conventional gripper system has an adhesion limit of 10 N in the Y direction and 10 N in the Z direction. The gripper system 100 is significantly improved, with an adhesion limit of 30 N in the Y direction. Similarly, the gripper system 100 has much higher adhesion limits in the Y direction for loads applied in the X-Y plane. The conventional gripper system has an adhesion limit of 30 N in the X direction and 10 N in the Y direction, but the gripper system 100 has an adhesion limit of 30 N in both the X direction and the Y direction.

During detachment, shown in FIG. 10, an external actuation (operation 132) continues to separate the two tiles apart to remove the spring preload (operation 130). The microwedges are thus returned to a default state 110 and deactivated, with a much weaker adhesion force (i.e., less than 0.05 KPa). In this state, the adhesives 120 are no longer sticky and can be easily detached from the surface.

In an alternative embodiment, instead of using a spring 104 during the preload operation, a motor may be used to actuate the carriages 102 together after bringing the adhesives 120 into contact with the surface. For example, the carriages 102 may be actuated together by a force-controlled motor, a torque-controlled motor, and/or a current-controlled motor. These motors may be configured to maintain a steady and strong preload shear force on the carriages, which keeps the microwedges bent and in the attached state 122. In such an embodiment, the gripper system 100 may be detached by the motors actuating the carriages 102 apart, straightening the microwedges, and bringing the microwedges back to the straightened state 122. As discussed above, once the microwedges are returned to the default state 110, the adhesion force may be much weaker, allowing for detachment of the adhesives 120 from the surface 128.

In a still further environment, the adhesives 120 may be mounted in the opposite direction, i.e., flipped over the Z-axis, such that the microwedges, while still directed towards the surface 128, are instead angled down and towards the center of the gripper system 100. In such an embodiment, the adhesives 120 may be activated by actuating the carriages 102 apart from one another, i.e., with a spring 104 or motor. In this way, the microwedges of the adhesive 120 are again preloaded and bent into the attached state 122 against the surface 128. Then, when detaching the gripper system 100 from the surface 128, the carriages 102 may be actuated towards one another, returning the microwedges to the default state 110, allowing for removal of the adhesives 120 from the surface 128.

Although the gripper system 100 is depicted as having two carriages 102 and two adhesives 120, other embodiments may include more than two (e.g., three or four carriages 102 and three or four adhesives 120), and may configure each of the carriages 102 and adhesives 120 similar to those discussed previously. Such an implementation may be more difficult to manufacture, but may proved more uniform adhesion for loads applied in the shear (i.e., X-Y) plane. For example, the adhesion limit in the X direction under such loads may be larger than in the Y direction. Using more than two adhesives 120 may allow for additional arrangements of the adhesives that balance out the relative adhesion limits in the X and Y directions, thus provided more uniform adhesion.

Figure 5:
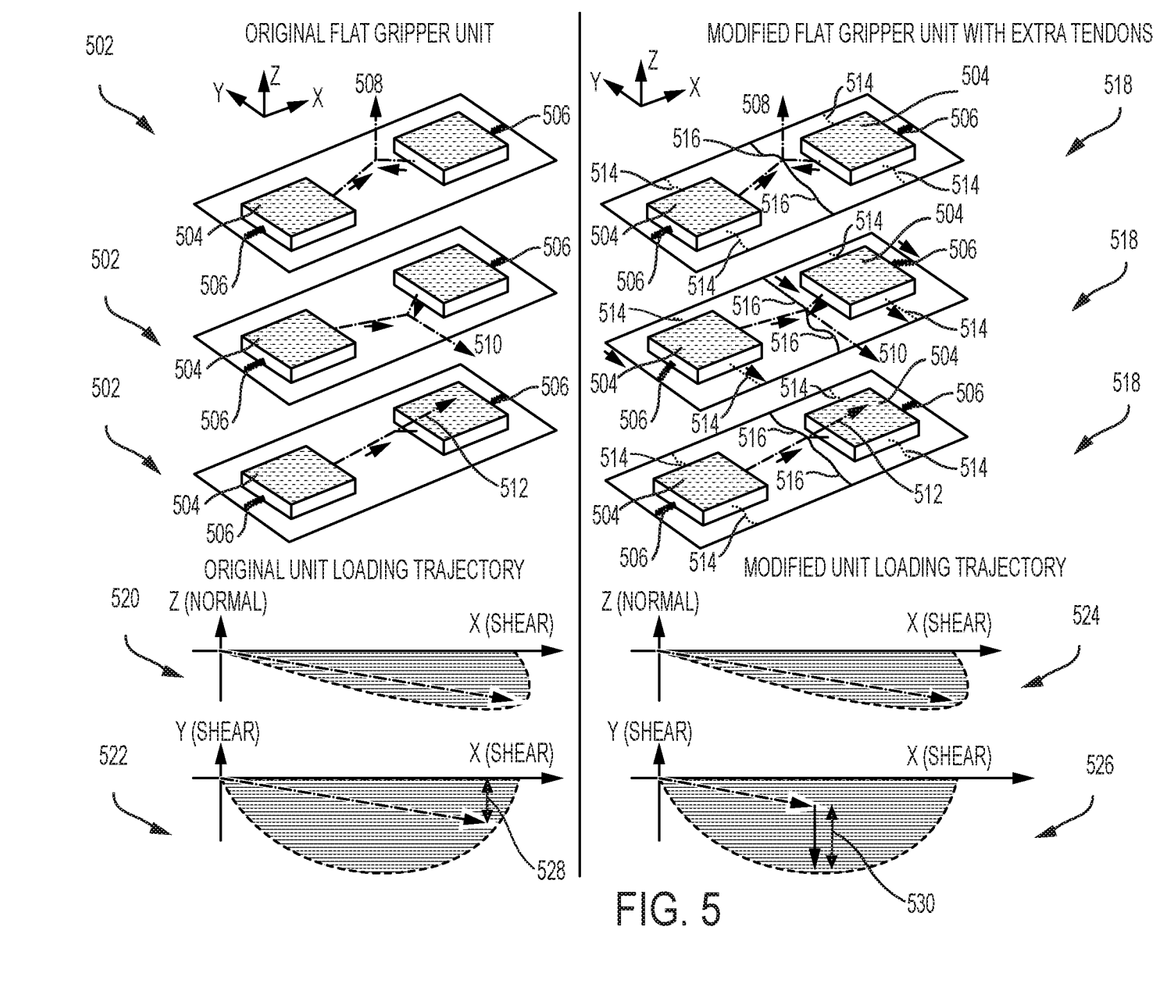
FIG. 5 illustrates multiple loadings of gecko gripper systems and adhesion limit comparisons, according to example embodiments of the present disclosure.

FIGS. 5A and 5B depict additional embodiments of a gripper system. FIG. 5A depicts a gripper system 502 with two adhesive tiles 504 and two support tendons 506 connected to the middle of the adhesive tiles 504 in the X direction. Although not expressly depicted here, the adhesive tiles 504 may be similar to the adhesive tiles of the gripper system 100, and may include, e.g., rigid backing 114, 118, a nonstretchable film, a linear carriage 102, and a soft material 112. Similarly, the loading tendons upon which the load 508 is applied may be implemented similar to the clamping film 119. FIG. 5A further depicts the gripper system 502 under loads 508, 510, 512, which will be discussed further below.

FIG. 5B depicts a gripper system 518 similar to the gripper system 502, but further including lateral films 514 and support tendons 516. The lateral films 514 are connected to the middle of the adhesive tiles 504 in the Y direction and the support tendons 516 are connected to the loading tendon in the Y direction. The gripper system 518 also includes the support tendons 506 connected to the adhesive tiles 504 in the X direction. As depicted, the support tendons 506 and lateral films 514 connected to the adhesive tile 504 are taut, but the support tendons 516 connected to the loading tendon have slack. FIG. 5B also shows the gripper system 502 under the loads 508, 510, 512.

Figure 3:
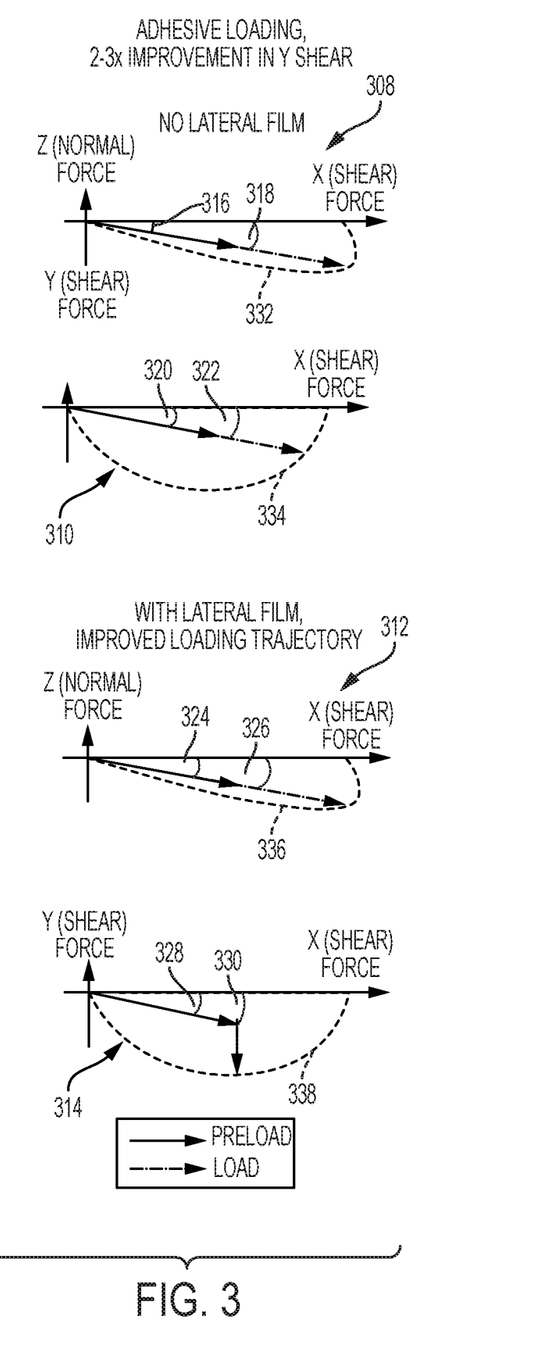
FIG. 3 an adhesion limit comparison of a gecko gripper system, according to an example embodiment of the present disclosure.

Similar to the discussion of FIG. 3 above, when the load 508 is applied in the X-Z plane, there is no Y-direction load, so the support tendons 516 and lateral films 514 are not under load, and the support tendons 516 are still slack. Thus, under the load 508, the gripper systems 502, 518 behave similarly and have similar adhesion limits, as shown in the graphs 520, 524. When the load 510 is applied in the Y-direction, the loading tendon is displaced in the Y direction, which creates a combined force in the X and Y directions at the base of the loading tendon where the loading tendon connects to the adhesive tiles 504. In certain embodiments, the loading tendon may be configured such that the force component in the X direction is approximately half of the absolute X limit, as seen in the graph 526. This configuration may allow for the largest Y direction adhesion limit for the load 510. Also, under the load 510, the support tendons 516 become taut, relieving the load from the base of the loading tendon and redirecting the load to the gripper system 518 support structure. Additionally, because the load 510 is applied in the Y direction, the remaining portion of the load 510 will transfer to the lateral films 514. In this way, once the support tendon 516 becomes taut, the Y-direction load applied to the gripper system 518 and the adhesive tile 504 is decoupled from any associated X-direction load from the loading tendon. Further, the initial displacement and X-direction load created by the loading tendon may act as an X-direction preload for the adhesive tiles 504, thus activating the adhesive. As a result, the total adhesion limit of the gripper system 518 in the Y direction of may be larger than the Y-direction adhesion limit of the gripper system 502, as shown in the graphs 522, 526, where the Y-direction limit 530 of the gripper system 518 is larger than the Y-direction limit 528 of the gripper system 502.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gripper system comprising:
a first linear carriage;
a second linear carriage spaced apart from the first linear carriage;
a first gecko adhesive patch, having first and second surfaces, wherein the first surface consists of a microwedge controllable adhesive;
a second gecko adhesive patch, having a first and second surface, wherein the first surface consists of a microwedge controllable adhesive;
at least one thin rigid backing, attached to the second surface of the first and second gecko adhesive patches;
at least one layer of non-stretchable, orthogonal flexible film glued to the thin rigid backing; and
a thick rigid backing glued to the film,
wherein the thick rigid backing further comprises a loading film connected to the thick rigid backing and one of the first or second linear carriage.

2. The gripper system of claim 1, wherein the thick rigid backing is connected to the first and second linear carriages.

3. The gripper system of claim 1, wherein the first and second linear carriages are constrained on a linear rail and connected with a spring.

4. The gripper system of claim 1, further comprising:
a first plurality of support tendons connected to the first gecko adhesive patch and the first linear carriage; and
a second plurality of support tendons connected to the second gecko adhesive patch and the second linear carriage.

5. The gripper system of claim 4, further comprising:
a third plurality of support tendons,
wherein at least one of the third plurality of support tendons is connected to the first gecko adhesive patch and a load tendon, and
wherein at least one of the third plurality of support tendons is connected to the second adhesive patch and the load tendon.

6. The gripper system of claim 4, wherein the first gecko adhesive patch is rectangular in shape and the first plurality of support tendons includes support tendons connected between each of at least three edges of the first gecko adhesive patch and the first linear carriage, and
wherein the second gecko adhesive patch is rectangular in shape and the second plurality of support tendons includes support tendons connected between each of at least three edges of the second gecko adhesive patch and the second linear carriage.

7. The gripper system of claim 5, wherein the first and second pluralities of support tendons are taut, and the third plurality of support tendons has slack when the gripper system is not under a load.

8. The gripper system of claim 1, wherein the microwedge controllable adhesive of the first and second gecko adhesive patches includes a plurality of microwedges that bend under shear load to increase the surface area of contact with a surface and thereby adhere to the surface.

9. The gripper system of claim 1, further comprising at least three layers of non-stretchable, orthogonal flexible film glued to the thin rigid backing.

10. The gripper system of claim 1, further comprising a soft material attached to the thick rigid backing and the first or second linear carriage.

11. A gripper system comprising:
a first linear carriage;
a second linear carriage spaced apart from the first linear carriage;
a first gecko adhesive patch, having first and second surfaces, wherein the first surface consists of a microwedge controllable adhesive;
a second gecko adhesive patch, having a first and second surface, wherein the first surface consists of a microwedge controllable adhesive;
at least one thin rigid backing, attached to the second surface of the first and second gecko adhesive patches;
at least one layer of non-stretchable, orthogonal flexible film glued to the thin rigid backing;
a thick rigid backing glued to the film; and
a soft material attached to the thick rigid backing and the first or second linear carriage.

12. The gripper system of claim 11, wherein the thick rigid backing further comprises a loading film connected to the thick rigid backing and one of the first or second linear carriage.

13. The gripper system of claim 11, wherein the thick rigid backing is connected to the first and second linear carriages.

14. The gripper system of claim 11, wherein the first and second linear carriages are constrained on a linear rail and connected with a spring.

15. The gripper system of claim 11, further comprising:
a first plurality of support tendons connected to the first gecko adhesive patch and the first linear carriage; and
a second plurality of support tendons connected to the second gecko adhesive patch and the second linear carriage.

16. The gripper system of claim 15, further comprising:
a third plurality of support tendons,
wherein at least one of the third plurality of support tendons is connected to the first gecko adhesive patch and a load tendon, and
wherein at least one of the third plurality of support tendons is connected to the second adhesive patch and the load tendon.

17. The gripper system of claim 16, wherein the first and second pluralities of support tendons are taut, and the third plurality of support tendons has slack when the gripper system is not under a load.

18. The gripper system of claim 15, wherein the first gecko adhesive patch is rectangular in shape and the first plurality of support tendons includes support tendons connected between each of at least three edges of the first gecko adhesive patch and the first linear carriage, and wherein the second gecko adhesive patch is rectangular in shape and the second plurality of support tendons includes support tendons connected between each of at least three edges of the second gecko adhesive patch and the second linear carriage.

19. The gripper system of claim 11, wherein the microwedge controllable adhesive of the first and second gecko adhesive patches includes a plurality of microwedges that bend under shear load to increase the surface area of contact with a surface and thereby adhere to the surface.

20. The gripper system of claim 11, further comprising at least three layers of non-stretchable, orthogonal flexible film glued to the thin rigid backing.

\* \* \* \* \*